United States Patent [19]
Fletcher et al.

[11] 3,864,960
[45] Feb. 11, 1975

[54] VACUUM LEAK DETECTOR
[76] Inventors: James C. Fletcher, Administrator of the Natl. Aeronautics and Space Administration with respect to an invention of; George P. Kazokas, Santa Monica, Calif.
[22] Filed: Oct. 2, 1973
[21] Appl. No.: 402,868

[52] U.S. Cl. .................. 73/46, 73/49.2, 340/242
[51] Int. Cl. ............................................. G01m 3/26
[58] Field of Search ............... 73/40, 46, 49.2, 49.3, 73/204; 340/242

[56] References Cited
UNITED STATES PATENTS
2,645,117  7/1953  Bendix et al. ......................... 73/49.2
3,425,277  2/1969  Adams .................................. 73/204
3,691,821  9/1972  Davey .................................. 73/49.2

Primary Examiner—Charles A. Ruehl
Assistant Examiner—Marcus S. Rasco
Attorney, Agent, or Firm—Howard J. Osborn; William H. King; John R. Manning

[57] ABSTRACT

A leak detector for use with high vacuum seals as used in feedthroughs and hatch covers for manned spacecraft and vacuum systems. Two thermistors are used, one exposed directly to vacuum and the other exposed to a secondary chamber formed by the seal being monitored and a second auxiliary seal. Leakage into the secondary chamber causes an unbalance of an electrical bridge circuit in which the thermistors are connected.

6 Claims, 2 Drawing Figures

VACUUM LEAK DETECTOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2,457).

BACKGROUND OF THE INVENTION

This invention relates generally to vacuum leak detection systems and more specifically to a method and apparatus for continuous monitoring of the vacuum integrity of dynamic and static vacuum seals.

In many applications, the proper functioning of vacuum seal is so vital that the malfunction of such a seal can be catastrophic. This is particularly the case in manned spacecraft operations where such devices as hatches may be repeatedly opened and resealed during a mission and where each resealing raises the likelihood of a malfunction. The basic method of verifying the integrity of such seals prior to the present invention has been through the use of portable leak detection equipment. Such devices are manipulated by hand to slowly pass in close proximity to all portions of the vacuum seal being inspected and thereby indicate any leak. It is apparent that as seals become larger, such as when a hatch is built large enough for a man to pass through, the time consumed in checking seals by the prior method grows in direct proportion to the length around the outside of such seal. Moreover, since such inspections are necessary after each closure of a seal, frequent use of a hatch further compounds the problem.

A similar problem exists in other applications such as where a moving shaft penetrates a vacuum barrier. If the seals in such cases are vital for safety, the present method of monitoring is to use the portable leak detection system on a scheduled basis to discover leaks before they cause trouble.

The substantial time and effort required to monitor and inspect vacuum seals by present methods points out the requirement for a system of monitoring which operates automatically and is sensitive enough to warn of a leak before the leak is large enough to cause serious consequences.

SUMMARY OF THE INVENTION

The invention is an apparatus and method for continuously monitoring vacuum seals. It has a sensitivity high enough to detect leakage before it reaches catastrophic levels. The leak monitoring system is constructed in such a configuration that only one monitor is required for each seal surveyed regardless of the length of the seal. Thus a large hatch cover or a manned space vehicle can be monitored simply and inexpensively and since each seal is monitored continuously the number of seals present in the vehicle does not significantly increase the inspection time. The low power drain and low weight of the individual leak detector make its multiple installation in a space vehicle practical and with conventional electronic sampling and alarm techniques, it can lead to a completely automatic system of leak detection.

The leak detector is dependent upon two matched thermistors. These units, which vary in their resistive characteristic depending on their temperature, are mounted within thermal cells which are essentially lengths of small diameter tubing. One such cell is closed at one end with the other end exposed to the vacuum environment. The thermistor in this cell is therefore always exposed to vacuum and is cooled only by radiation. This thermistor is used as a reference to which the other sensing thermistor is compared.

The cell of the sensing thermistor is mounted with both ends open. One end is exposed to the vacuum environment just as the reference cell. The other end is, however, exposed to a detector chamber adjacent to the seal being surveyed. This detector chamber is formed on the vacuum side of the seal within the thickness of the bulkhead in which the hatch or feedthrough for which the seal operates is mounted. It is formed by the use of an auxiliary seal which seals off the detector chamber within the bulkhead. This detector chamber is contiguous with the main seal so that, with the detector chamber at vacuum, all possible leakage through the main seal will occur into the detector chamber rather than directly into the vacuum environment. The tubing forming the cell of the sensing thermistor is then the only path by which air leaking past the main seal can vent to vacuum.

Since all the air leaking past the main seal flows past the sensing thermistor the temperature of the thermistor is altered compared to that of the reference thermistor. When these thermistors are connected into a conventional electronic bridge sensing circuit the resulting sensitivity is such that extremely low leak rates can be detected in short times. The placement of both thermistors in a vacuum atmosphere gives the system a very low current drain. The current is supplied directly to the thermistors to self-heat them, and the current requirement is related to the cooling effects of the environment in which the unit is placed. The vacuum environment limits the external cooling of the thermistors to only radiation allowing the very small self-heating current. The convection cooling of the air which leaks past the main seal is the cause of a changed cooling characteristic for the sensing thermistor thus causing the change in temperature.

DETAILED DESCRIPTION OF THE INVENTION

Figure 1:
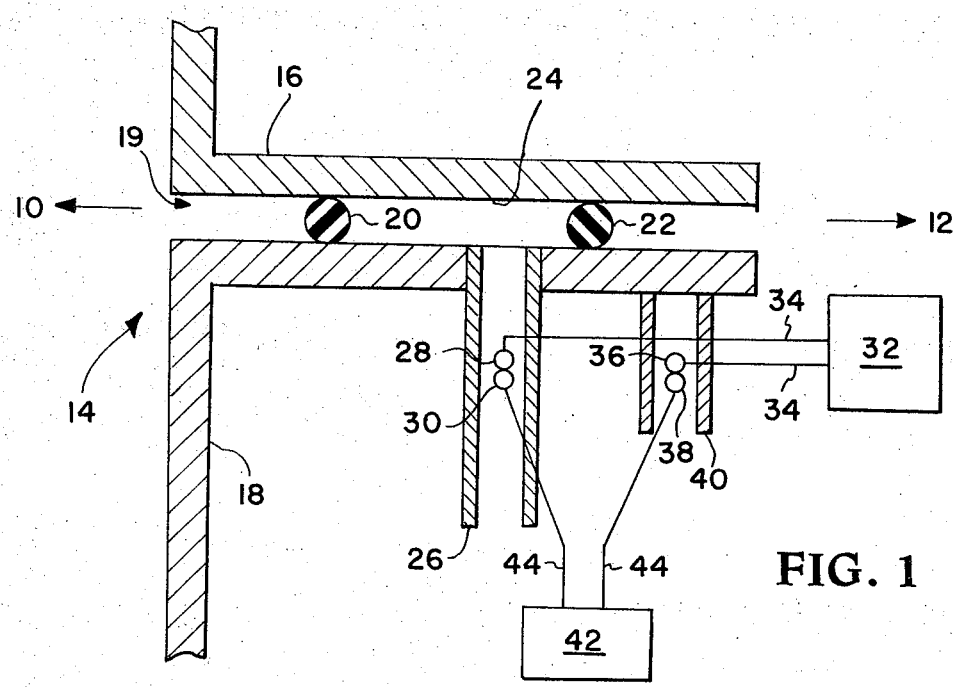
FIG. 1 is a simplified cross section of the leak detector.

The basic concept of the invention is illustrated in FIG. 1 where gaseous atmosphere 10 is isolated from vacuum environment 12 by barrier 14. Barrier 14 is formed by removable member 16 in close proximity with fixed member 18. The clearance space 19 between removable member 16 and fixed member 18 is closed off by main seal 20 which is attached to fixed member 18 by conventional means and is compressed by removable member 16 to complete barrier 14. Since both members 16 and 18 are solid members the potential leak path of gas is only through the clearance space 19 past main seal 20 and into the vacuum environment 12.

Secondary seal 22 is also attached to fixed member 18 by conventional means at a position in the clearance space 19 down-stream from main seal 20 such that a detector chamber 24 is formed into which gas leaking past main seal 20 will enter. Tubing 26 leads from detector chamber 24 through fixed member 18 and permits gas which enters detector chamber 24 to be vented to vacuum atmosphere 12. Since no other vent exists, all gas leaking past main seal 20 will exit through tubing 26 regardless of the length of main seal 20. Heater 28 and temperature sensor 30, mounted adjacent to each other within tubing 26, are attached by some conventional means such as heat insulating ceramic, whereby no heat is conducted to tubing 26 or fixed member 18 when energy source 32 is activated to cause a temperature rise of heater 28. The temperature actually reached by heater 28 will be dependent upon the energy transmitted to it by energy source 32 through feed lines 34 and upon the heat removed from it by cooling. When no gas is being vented through tubing 26 this cooling will only be by radiation, but when gas vents, the cooling will dramatically increase and therefore the temperature of heater 28 as measured by temperature sensor 30 will go down. This temperature decrease is directly related to gas leakage past main seal 20.

Reference heater 36 and reference temperature sensor 38 are mounted in tubing 40 by the identical method that heater 28 and temperature sensor 30 are mounted tubing 26. Moreover, the characteristics of both heaters and both temperature sensors are matched so that when reference heater 36 is fed from energy source 32 through feed lines 34 the only difference in response of the temperature of both heaters is caused by gas flow cooling of heater 28. The temperatures of reference heater 36 and heater 28 are compared by temperature comparator 42 connected by lines 44 and therefore temperature changes not associated with gas leak rate are eliminated.

The system described is particularly suited for continuous monitoring of leaks because of its very low power drain. This results because of the positioning of both heaters in the vacuum environment. In such an environment a heater is subject to an absolute minimum of cooling since no convection occurs and the mounting method, as described above, severely limits the heat conduction to other parts of the assembly. Thus, the only cooling method available is radiation which itself is highly dependent upon the temperature of the heater. Therefore, since for any temperature of operation the power used by the heaters is equal to that carried away by cooling mechanisms the power consumption of the invention is drastically limited by using a relatively low operating temperature for the heaters. The operating temperature is that temperature at which the heaters stabilize when no leak exists.

Figure 2:
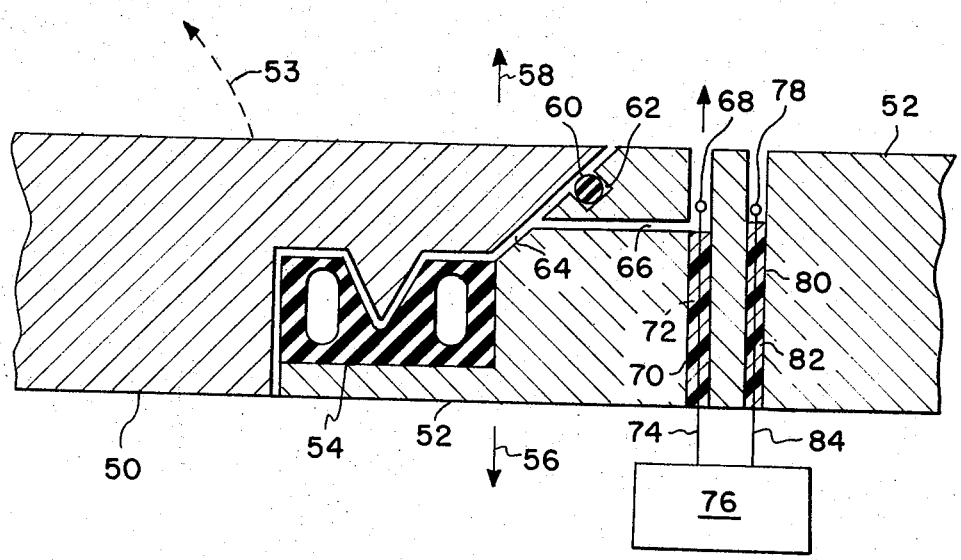
FIG. 2 is a cross section of the leak detector installed in conjunction with space vehicle hatch.

FIG. 2 depicts a preferred embodiment of the invention for use in conjunction with a spacecraft hatch. Hatch 50 moves away from bulkhead 52 in direction 53 and normally seals against main seal 54 leaving an expected leak path around main seal 54 between cabin atmosphere 56 and vacuum environment 58. O-ring 60 is mounted in channel 62 to form a secondary seal and close off detector chamber 64. Passage 66 vents any cabin atmosphere 56 leaking past main seal 54 to vacuum environment 58. Sensing thermistor 68 combines the functions and characteristics of both the heater 28 and temperature sensor 30 of FIG. 1 and is mounted in passage 70 by potting compound 72 which also encloses lead 74 connecting thermistor 68 in to a conventional Wheatstone bridge circuit 76. Reference thermistor 78, with characteristics matched to sensing thermistor 68, is similarly mounted in hole 80 filled with potting compound 82 to enclose lead 84 to bridge circuit 76. The result is identical thermistor installations except for the cooling effect of the gas leak upon sensing thermistor 68. Bridge circuit 76 serves the dual purpose of supplying both sensing thermistor 68 and reference thermistor 78 with energy to heat them and comparing the resistances of the two thermistors which are a direct measure of their temperatures. The indication given by bridge circuit 76 is therefore a direct and sensitive reading of the leak rate past main seal 54. In a typical installation using thermistors, leak rates as low as $10^{-8}$ standard cubic centimeters per second will be detected with response times in milliseconds.

It is to be understood that the forms of the invention herein shown are merely preferred embodiments. Various changes may be made in the size, shape and the arrangement of parts; equivalent means may be substituted for those illustrated and described; and certain features may be used independently from others without departing from the spirit and scope of the invention as defined in the following claims.

What is claimed as new and desired to be secured by Letters Patent of the United States is:

1. An apparatus for the detection of vacuum leaks at a main seal between a first member and a second member which together form a barrier between a gaseous atmosphere and a vacuum environment comprising;

secondary seal means attached along the expected leak path enclosing a chamber on the vacuum side of the main seal, one boundary of which is the main seal;

gas flow exit means connecting said chamber to said vacuum environment;

first heat generating means mounted in said vacuum environment within said gas flow exit whereby gas leaking past the main seal vents to the vacuum environment by flowing past said heat generating means;

first temperature measurement means mounted adjacent to said first heat generating means whereby the temperature of said first heat generating means is measured;

second heat generating means of identical characteristics to said first heat generating means mounted in said vacuum environment whereby said second heat generating means is isolated from said gas flow exit means;

second temperature measurement means of identical characteristic to said first temperature measurement means mounted adjacent to said second heat generating means whereby the temperature of said second heat generating means is measured; and temperature comparison means interconnected to said first and second temperature measurement means for comparing the temperatures of said first heat generating means and said second heat generating means indicating the rate of gas flow cooling occuring at first heat generating means and thereby yielding a measure of gas leak rate past said main seal.

2. An apparatus for the detection of vacuum leaks as in claim 1 wherein a first temperature sensor, which is electrically heated, functions as both the first heat generating means and the first temperature measuring means and a second temperature sensor, which has characteristics identical to the first temperature sensor, functions as both the second heat generating means and the second temperature measurement means.

3. An apparatus for the detector of vacuum leaks as in claim 2 wherein said first temperature sensor and said second temperature sensor are thermistors of matched characteristics.

4. An apparatus for the detection of vacuum leaks as in claim 3 wherein said temperature comparison means is a bridge circuit.

5. An apparatus for the detection of vacuum leaks as in claim 1 wherein the main seal is a hatch seal of a spacecraft comprising:
   secondary seal means along the expected leak path enclosing a detector chamber, one boundary of which is the hatch seal;
   gas flow exit means connecting said detector chamber to the vacuum environment outside of the spacecraft;
   sensing thermistor mounted in the vacuum environment within said gas flow exit whereby gas leaking past said hatch seal vents to the vacuum by flowing past said sensing thermistor;
   reference thermistor with characteristics identical to said sensing thermistor mounted in the vacuum environment whereby said reference thermistor is isolated from said gas flow exit means; and
   resistance bridge interconnected with said sensing thermistor and said reference thermistor whereby said thermistors are electrically heated and the temperatures of said thermistors are compared thereby indicating the existance of any difference in cooling rate caused by a leak at the hatch seal.

6. A method for detection of vacuum leaks at a main seal between a first member and a second member which together form a barrier between a gaseous atmosphere and a vacuum environment comprising:
   placing a secondary seal means along the expected leak path on the vacuum side of the main seal to enclose a chamber, one boundary of which is the main seal;
   venting said chamber to said vacuum environment by means of a passageway;
   mounting a first heat generating means in said passageway in said vacuum environment whereby gas leaking past the main seal vents to the vacuum environment by flowing past said heat generating means;
   mounting a first temperature sensing means adjacent to said first heat generating means whereby the temperature of said first heat generating means is measured;
   mounting second heat generating means of identical characteristic to said first heat generating means in said vacuum environment whereby said second heat generating means is isolated from said gas flow exit means;
   mounting second temperature means of identical characteristics to said first temperature measurement means adjacent to said second heat generating means whereby the temperature of said second heat generating means is measured;
   interconnecting temperature comparison means to said first and second temperature measurement means to compare the temperature of said first heat generating means and said second heat generating means and to indicate the rate of gas flow cooling occuring at first heat generating means and thereby measuring the gas leak rate past said main seal.

* * * * *